United States Patent
Huang et al.

(10) Patent No.: US 8,718,680 B2
(45) Date of Patent: May 6, 2014

(54) NUMBER IDENTIFICATION AND TAGGING

(71) Applicants: Tao Huang, San Jose, CA (US); Deepak Chandra, Mountain View, CA (US)

(72) Inventors: Tao Huang, San Jose, CA (US); Deepak Chandra, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/630,102

(22) Filed: Sep. 28, 2012

(65) Prior Publication Data

US 2014/0094193 A1 Apr. 3, 2014

(51) Int. Cl.
*H04W 24/00* (2009.01)

(52) U.S. Cl.
USPC .................. 455/456.3; 455/456.1; 455/404.2; 455/414.1

(58) Field of Classification Search
USPC ....... 455/456.3, 456.1, 404.2, 414.1
See application file for complete search history.

(56) References Cited

U.S. PATENT DOCUMENTS

| | | | |
|---|---|---|---|
| 7,958,558 B1 * | 6/2011 | Leake et al. | 726/23 |
| 8,200,196 B2 * | 6/2012 | David et al. | 455/412.1 |
| 2012/0124613 A1 | 5/2012 | Reddy et al. | |

FOREIGN PATENT DOCUMENTS

| | | |
|---|---|---|
| KR | 10-0627718 | 9/2006 |
| KR | 10-2010-0011566 | 2/2010 |
| KR | 10-0967352 | 7/2010 |
| WO | 2012/118610 | 9/2012 |

OTHER PUBLICATIONS

International Search Report and Written Opinion for Application No. PCT/US2013/062280, dated Jan. 16, 2014, 11 pages.

* cited by examiner

*Primary Examiner* — Nghi H Ly
(74) *Attorney, Agent, or Firm* — Fish & Richardson P.C.

(57) ABSTRACT

Methods, systems, and apparatus, including computer programs encoded on computer storage media, for number identification and tagging. One of the methods includes identifying a content item to be provided to a mobile device. The method includes identifying a location of the mobile device. The method includes identifying at least one calling format based on the location. The method includes identify a calling number included in the content item based on the at least one calling format. The method includes generating an altered version of the content item to tag the calling number. The method also includes provide the altered version to the mobile device.

24 Claims, 4 Drawing Sheets

NUMBER IDENTIFICATION AND TAGGING

BACKGROUND

This specification relates to calling number identification and tagging.

Mobile devices are capable of access to web pages on the Internet and also placing telephone calls. It is frequently advantageous for a content provider to enable a user to place a telephone call directly from a web page. A hypertext markup language (HTML) link includes semantics that allow users to dial a calling number by clicking on a link on a web page.

SUMMARY

In general, one innovative aspect of the subject matter described in this specification can be embodied in methods that include the actions of identifying a content item to be provided to a mobile device. The methods include the actions of identifying a location of the mobile device. The methods include the actions of identifying at least one calling format based on the location. The methods include the actions of identify a calling number included in the content item based on the at least one calling format. The methods include the actions of generating an altered version of the content item to tag the calling number. The methods also include the actions of provide the altered version to the mobile device.

The foregoing and other embodiments can each optionally include one or more of the following features, alone or in combination. The methods may include the actions of determining to alter the content item based a comparison of a selection rate of previously provided altered versions of the content item to a selection rate of previously provided unaltered versions of the content item. The methods may include the actions of altering the content item to report when the calling number is selected from the altered content item. The selection rate of previously provided altered versions may be a ratio of the number of times the calling number is selected to the number of times the altered versions were provided. At the least one calling format may be selected based on area codes located near the mobile device. Identifying a location of the mobile device may include identifying a location based on an IP address assigned to the mobile device. Identifying a location of the mobile device may include identifying a country in which the mobile device is location. Identifying a location of the mobile device may include identifying a location based on a calling number of the mobile device.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

Particular embodiments of the subject matter described in this specification can be implemented so as to realize one or more of the following advantages. User experience with content items can be improved. The performance of content items can be improved. Click through rates can be increased.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
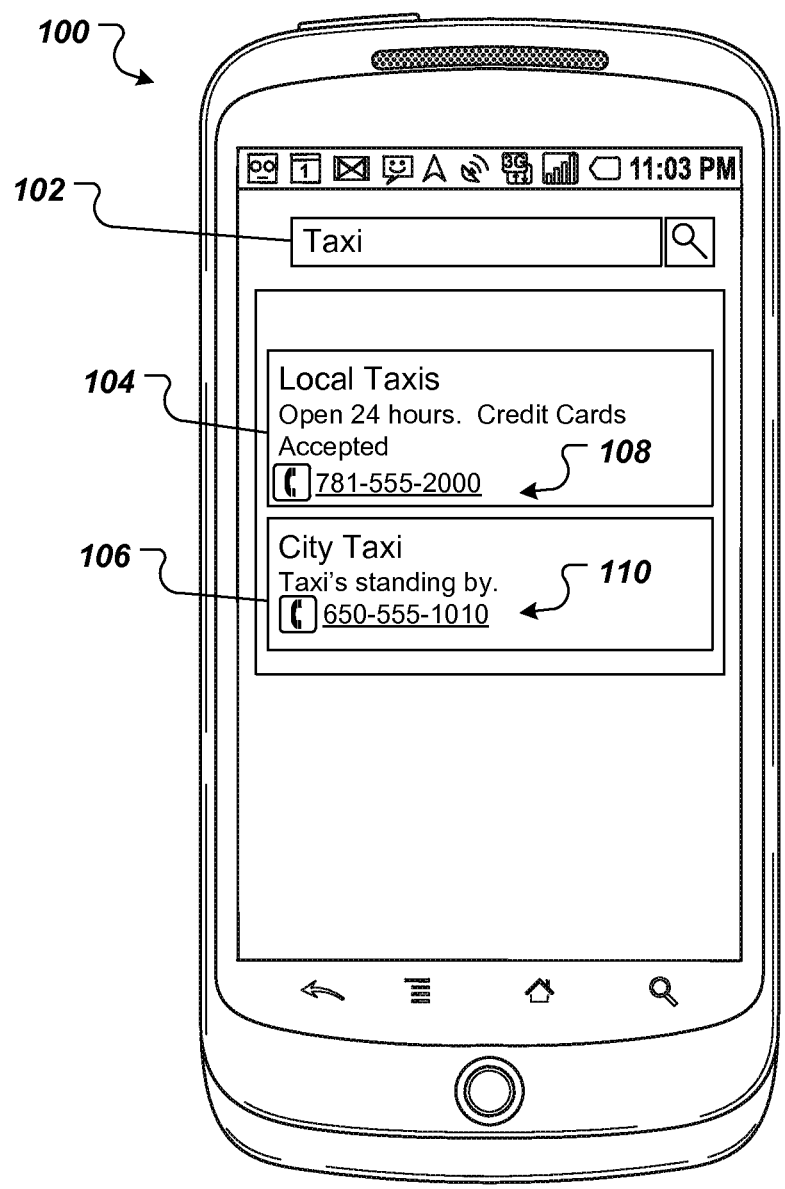
FIG. 1 illustrates an example content item displayed on a mobile device.

FIG. 1 illustrates a content item displayed on a mobile device. In the example of FIG. 1, the user of the mobile device 100 submits a search request over the Internet, for example, the user of the mobile device 100 submitted a search for the word "taxi" in a search field 102. The mobile device 100 displays content items 104 and 106. Each of the content items includes a calling number 108 and 110. The calling numbers are tagged (for example, by underlining), indicating to the user that the user may select the calling number displayed on the mobile device and the mobile device 100 will automatically dial the corresponding number. In some implementations, a content management service is notified when the user selects the displayed calling number.

In some scenarios, the content provider provides a properly formatted content item that includes the calling number and Hyper Text Markup Language (HTML) tags to instruct the mobile device to call the calling number when a link is selected. For example, the content item may include the HTML code <a href="tel:7815552000">781-555-2000</a>. In other scenarios, the content provider may have provided a content item without the HTML tag. For example, the content item may include the untagged text "650-555-1010."

A content management system can analyze the content item prior to delivering the content item to the mobile device and insert click to call tags (e.g. <a href="tel:6505551010">650-555-1000</a>) when the content management system detects a calling number. For example, the content management system can compare text in a content item to known calling formats for a particular region. Text that matches the calling format may be considered a potential calling number. The content management system can use feedback mechanisms to determine the likelihood that the calling number is correctly identified, for example, if users routinely ignore the tagged calling number, the text was probably misidentified as a calling number.

Figure 2:
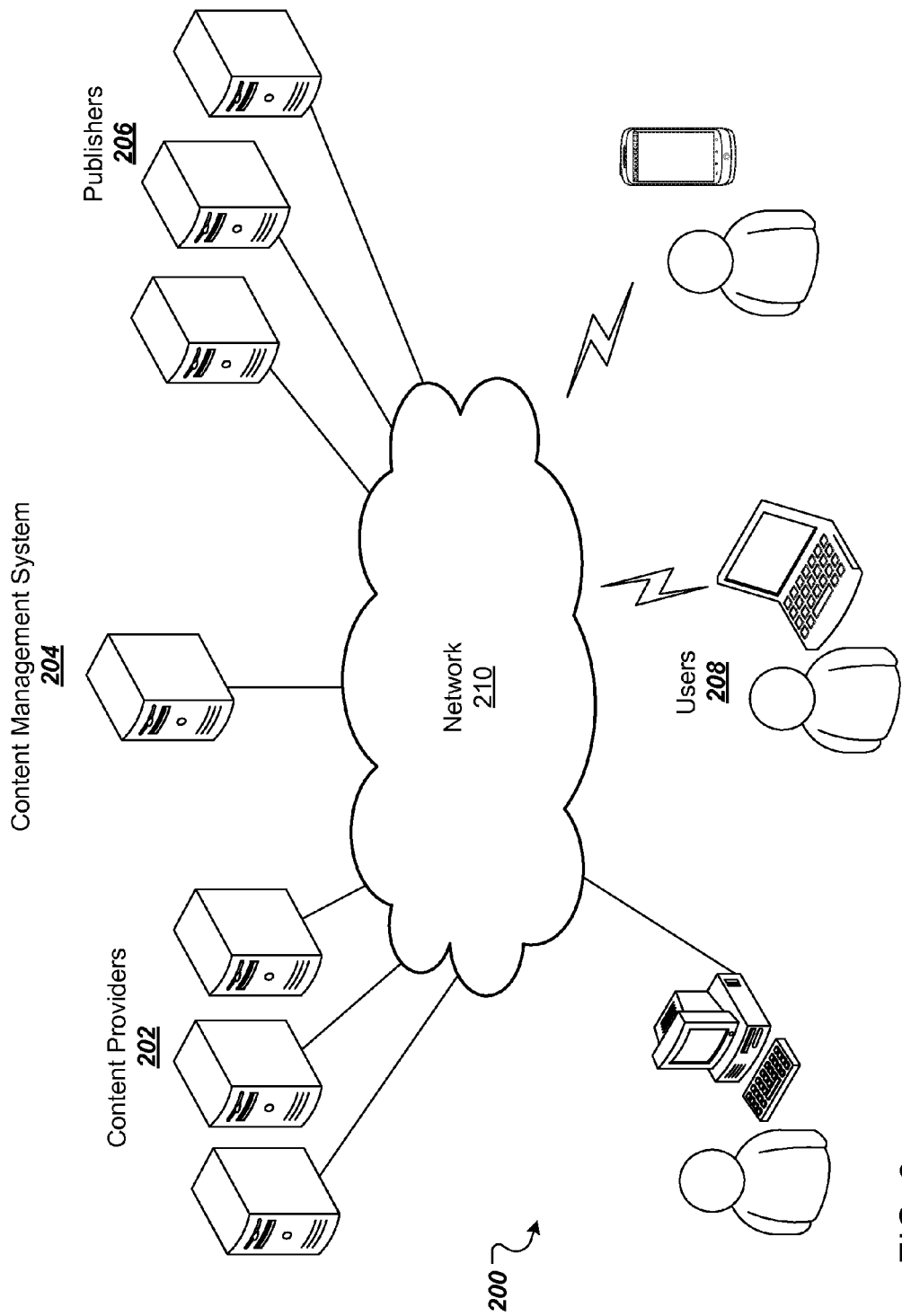
FIG. 2 is a block diagram of an example online content delivery system 200.

FIG. 2 is a block diagram of an example online content delivery system 200. In some implementations, one or more content providers (e.g., advertisers) 202 can directly, or indirectly, enter, maintain, and obtain content (e.g., advertisement or "ad") information in a content management system 204. Though reference is made in numerous places in this document to advertising, other forms of content, including other forms of sponsored content, can be delivered by the system 200. The content may be in the form of graphical ads, such as banner ads, text only ads, image ads, audio ads, video ads, ads combining one of more of any of such components, etc. The content may also include embedded information, such as a link, meta-information, and/or machine executable instructions. One or more publishers 206 may submit requests for content to the content management system 204. The content management system 204 responds by sending content to the requesting publisher 206 (or directly to an end user) for placement on one or more of the publisher's web properties (e.g., websites or other network-distributed content). The content can include embedded links to landing pages, e.g., pages on the content providers 202 websites, that a user is directed to when the user clicks or otherwise interacts with a content item presented on a publisher website.

A computer network 210, such as a local area network (LAN), wide area network (WAN), the Internet, or a combination thereof, connects the content providers 202, the content management system 204, the publishers 206, and the users 208. The network can include one or more networks. The network(s) may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, General Packet Radio System (GPRS), or one or more television or cable networks, among others. For example, the communication may occur through a radio-frequency transceiver. In addition, short-range communication may occur, such as using a BLUETOOTH, WiFi, or other such transceiver.

One example of a publisher 206 is a general content server that receives requests for content (e.g., articles, discussion threads, music, video, graphics, search results, web page listings, information feeds, etc.), and retrieves the requested content in response to the request. The content server (or a user that is accessing the content source by way of a redirect) may submit a request for one or more content items (e.g., ads) to a content server in the content management system 204. The request may include a number of content items desired. The request may also include content request information. The content request information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server can combine the requested content with one or more of the content items provided by the content management system 204. This combined content can be sent to the user 208 that requested the content for presentation in a viewer (e.g., a browser or other content display system). Alternatively, the content can be combined at a user's device (e.g., by combining in a user's browser content from the content source with content items provided by the content management system 204). An example user device is an electronic device that is under control of a user and that is capable of requesting and receiving resources over the network. A user device (an examples of which includes the device of FIG. 1) may include one or more processing devices, and may be, or include, a mobile telephone (e.g., a smartphone), a laptop computer, a handheld computer, a tablet computer, a network appliance, a camera, an enhanced general packet radio service (EGPRS) mobile phone, a media player, a navigation device, an email device, a game console, an interactive or so-called "smart" television, or a combination of any two or more of these data processing devices or other data processing devices. In some implementations, the user device can be included as part of a motor vehicle (e.g., an automobile, an emergency vehicle (e.g., fire truck, ambulance), a bus).

The content server can transmit information about the content items back to the content server, including information describing how, when, and/or where the content items are to be rendered (e.g., in HTML or JavaScript™).

Another example, publisher, 206 is a search service. A search service identifies resources by crawling and indexing resources provided by the content publishers on Web sites. Data about the resources can be indexed based on the resource to which the data corresponds. Indexed and, optionally, cached copies of the resources that match input keywords can be retrieved and output, e.g., in response to a search query. For example, a search service can receive queries for search results. In response, the search service can retrieve relevant search results from an index of documents (e.g., from an index of web pages). Search results can include, for example, lists of web page titles, snippets of text extracted from those web pages, and hypertext links to those web pages, and may be grouped into a predetermined number of (e.g., ten) search results.

The search service can submit a request for content items to the content management system 204. The request may include a number of content items desired. This number may depend on the content of the initial search query, the search results, the amount of screen or page space occupied by the search results, the size and shape of the content items, etc. In some implementations, the number of desired content items will be from one to ten, or from three to five. The request may also include the query (as entered or parsed), information based on the query (such as geo-location information, whether the query came from an affiliate and an identifier of such an affiliate), and/or information associated with, or based on, the user or the search results. Such information may include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores.

The search service can combine the search results with one or more of the content items provided by the content management system 204. This combined information can then be forwarded, either directly or indirectly, to the user 208 that requested the content. The search results can be maintained as distinct from the content items, so as not to confuse the user between paid content and presumably neutral search results.

The search service can also transmit information about the content items and when, where, and/or how the content items were rendered back to the content management system 204.

In some examples, the content management system 204 may include an auction process to select content. Content providers (e.g., advertisers) may be permitted to select, or bid, an amount the providers are willing to pay, for example, for interaction with a provided content item (e.g., for each click of an advertisement as a cost-per-click amount an advertiser pays when, for example, a user clicks on an advertisement).

Figure 3:
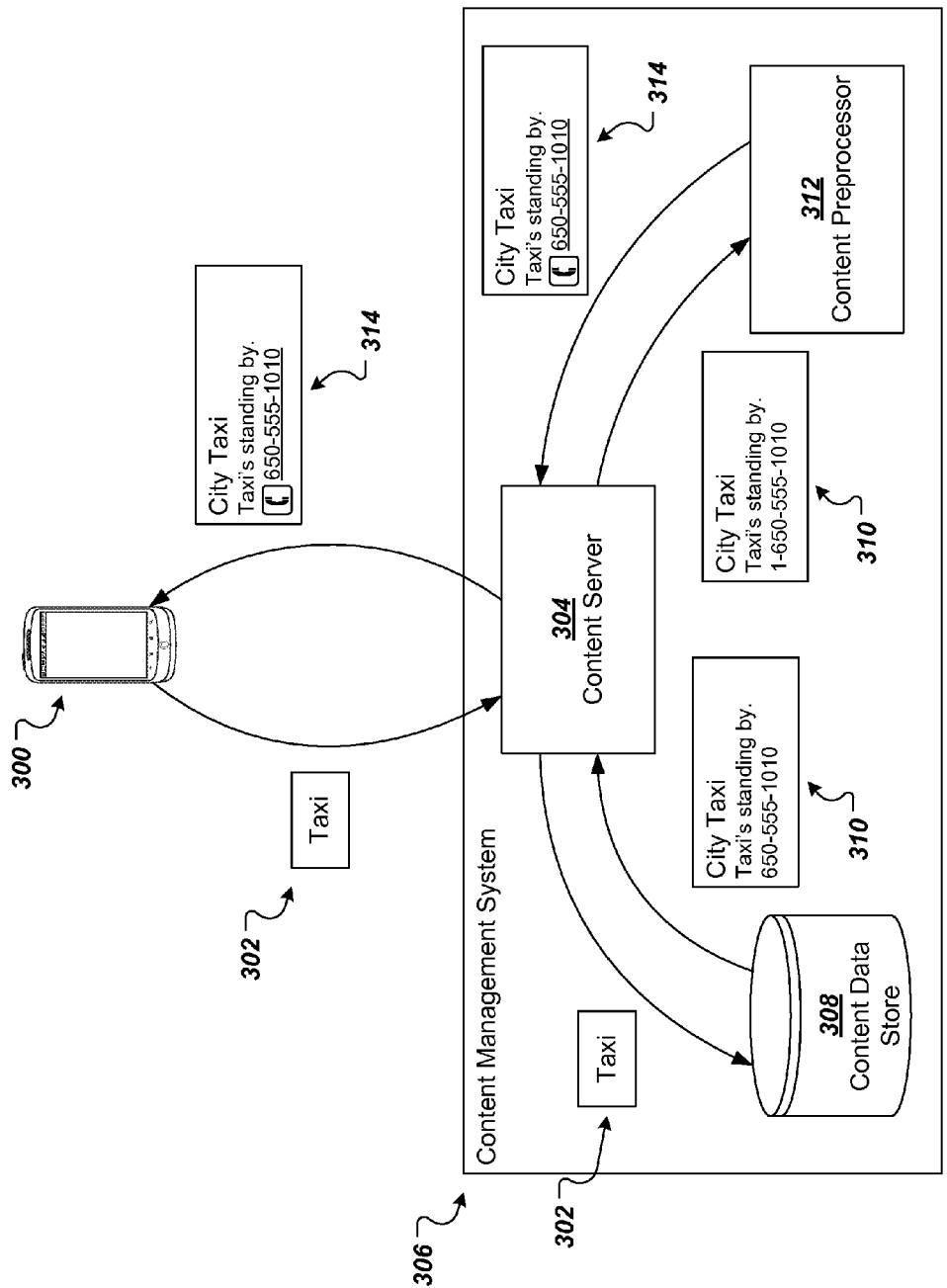
FIG. 3 illustrates an example of a content management service providing a content item to a mobile device.

FIG. 3 illustrates an example of a process performed by a content management service, such as that described above, to provide a content item to a mobile device. The mobile device 300 sends a query 302 to a content server 304 on a content management system 306. The content server 304 uses the query 302 to obtain a content item 310 from a content data store 304. For example, the content server 304 may identify content items that are associated with a keyword. For example, a query for "taxi" may cause the content server 304 to obtain content items associated with the keywords "taxi", "cab", "lorry", etc. . . .

The content server 304 sends the content item 310 to the content pre-processor 312. The content pre-processor analyzes the content item 310 to determine if an untagged calling number is present in the content item 312. Calling numbers can be identified, for example, by using regular expressions. A regular expression provides a method to "match" (specify and recognize) strings of text, such as particular characters, words, or patterns of characters. For example, the regular expression "\(\d{3})" matches a "(" character, followed by three digits, followed by a ")" character. A regular expression processor compares the pattern to text and identifies the parts of the text that match the pattern.

However, because calling numbers have different formats in different countries, selecting the correct format can depend on the location of the mobile device 300.

The location of the mobile device 300 can be determined using global positioning system (GPS) coordinates provided by the device, an Internet Protocol address assigned to the mobile device, or through other means, such as determining an approximate position based on the cellular telephone tower through which the mobile device is communicating. The content pre-processor selects a regular expression based on the location of the mobile device. For example, if the mobile device 300 is in the United States, the content pre-processor selects a regular expression to match standard United State calling number formats (e.g. (XXX) XXX-XXXX and XXX-XXX-XXXX) such as "((\(\d{3}\))|(\d{3}-))\d{3}-\d{4}." Similarly, if the mobile device 300 is in France the content pre-processor selects a regular expression to match standard French format (e.g. XX XX XX XX XX) such as "\d{2} \d{2}\d{2}\d{2}".

In some implementations, the content pre-processor can further narrow the calling numbers which are selected, for example, by only altering numbers that are in the same or nearby area codes. For example, if the mobile device 300 is in Boston, Mass., the pre-processing component may only alter numbers that appear to reference the area codes 617, 781, 857, 888, and 800. Similarly, if the mobile device 300 is in France, the pre-processing component may only alter numbers that appear to reference the geographic zones (e.g. numbers beginning with 01, 02, 03, 04, 05, 06, 07, 08, and 09).

In some examples, when altering a content item provided by a content provider, the content pre-processor will have a degree of certainty that the alteration is correct. For example, it would be inappropriate for the content pre-processor to tag an order identifier or tracking number as a calling number. In this regard, users of mobile devices can easily recognize calling numbers even if it is more difficult for a computer to make a similar determination. To reduce the likelihood of an error, the content pre-processor can utilize user feedback. For example, the content pre-processor may determine whether or not to tag an apparent calling number based on an indicator of the success of previous alterations.

As discussed above, the pre-processing component may alter the content item such that, when the calling number is selected, the content management system 306 is notified. The system can monitor the number of times a content item is provided to users and the number of times the content item is selected by users. To test the accuracy of the calling number identification, the system can selectively send unaltered content items to some users. The number of times the unaltered content item is selected by any user divided by the number of times the unaltered content was provided to any user is referred to as the selection rate of the unaltered content. Similarly, the number of times an altered content item is selected by any user divided by the number of times the altered content was provided to any user is referred to as the selection rate of the altered content.

A historic selection rate of an altered version of the content item can be compared to a historic selection rate of the unaltered version of the content item. If the selection rate of the altered version exceeds the selection rate of the unaltered version by a threshold amount (e.g., 10%, 20%?), then the pre-processing component determines that the alteration was correct. If the selection rate of the altered component does not exceed the selection rate of the unaltered component by the threshold, then the pre-processing component determines that the alteration is not correct.

The content pre-processor can also determine whether to tag an apparent calling number based on the content provider. If the content provider has submitted previous content items that include tagged calling numbers, then the apparent untagged calling number is less likely to be correctly identified. In contrast, if a content provider rarely or never tags calling numbers in their content items, then an apparent untagged calling number is more likely to be correctly identified.

The content pre-processor generates an altered content item 314 that includes a tagged calling number. The altered content item 314 is returned to the content server 304. The content server 304 sends the altered content item 314 to the mobile device 300.

Figure 4:
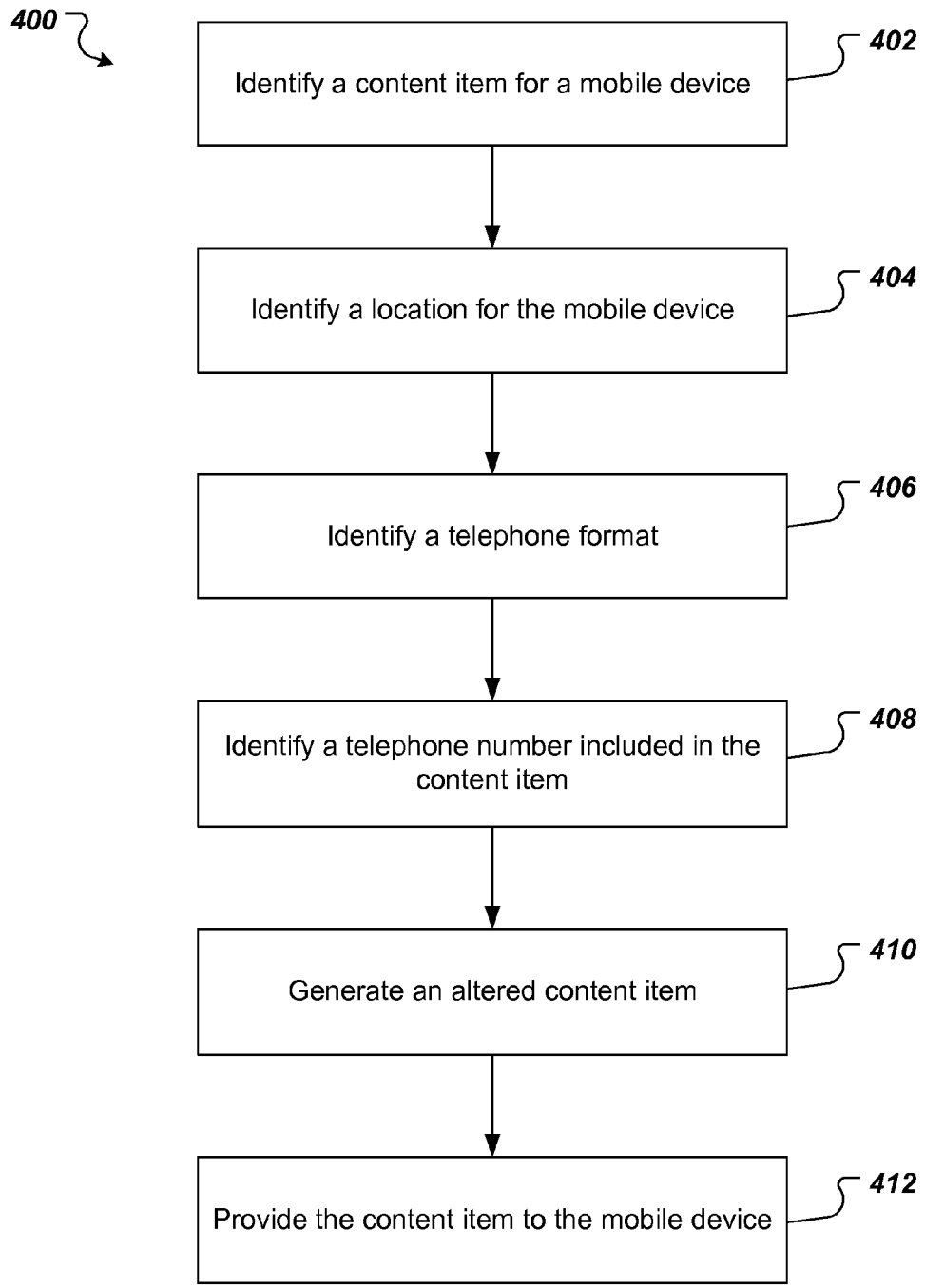
FIG. 4 is a flow chart of an example of a process to identify and tag calling numbers.

FIG. 4 is a flow chart of an example of a process to identify and tag calling numbers. The process 400 may be performed by, for example, the content management system 204 of FIG. 2. For simplicity, the process will be described in terms of a system performing the process.

Content items are identified for delivery to a mobile device (402). The content items may be identified based on keywords provided by the mobile device to a content management system.

A location of the mobile device may be identified (404). The location may be determined based on GPS coordinates provided by the mobile device, the IP address of communications originating at the mobile device, or by information provided by a cellular communications network on which the mobile device is communicating (for example, a location of a cell tower receiving signals from the mobile device.). For example, the location of mobile device 300 of FIG. 3 may be determined in response to receiving the query 302. In some implementations, a location may be determined based on the format of a calling number assigned to the mobile device.

Calling formats are identified (406). The calling format may be calling formats that are used in the location of the mobile device. In some implementations, the calling format may be determined based on the country in which the mobile device is located. In other implementations, the calling format may be limited by the area codes surrounding the mobile device. For example, the content preprocessor 312 of FIG. 3 may identify one or more regular expressions that include patterns designed to match calling numbers in the area around the mobile device 300.

Calling numbers included in the content of the content item are identified (408). The calling numbers may be identified using a regular expression based on the calling formats. For example, the content 312 preprocessor may include a regular expression processor that identifies calling numbers in the text of the content item 310.

Altered content items are generated (410). The content item may be altered to tag calling number with a link that enables a mobile device to place a call directly after selecting the link. For example, the content preprocessor 312 alters the content item 310 by tagging the calling number and generates an altered content item 314 that includes the tagged calling number.

The altered content item is provided to the mobile device (412). For example, the tagged calling number is provided to the mobile device 300.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible program carrier for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to as a program, software, a software application, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more processing devices, comprising:
    identifying a content item to be provided to a mobile device;
    identifying a location of the mobile device;
    identifying at least one calling format based on the location;
    identify a calling number included in the content item based on the at least one calling format;
    generating an altered version of the content item to tag the calling number; and
    provide the altered version to the mobile device.

2. The method of claim 1, further comprising, determining to alter the content item based a comparison of a selection rate of previously provided altered versions of the content item to a selection rate of previously provided unaltered versions of the content item.

3. The method of claim 2, further comprising altering the content item to report when the calling number is selected from the altered content item.

4. The method of claim 3, wherein the selection rate of previously provided altered versions is a ratio of the number of times the calling number is selected to the number of times the altered versions were provided.

5. The method of claim 1, wherein at the least one calling format is selected based on area codes located near the mobile device.

6. The method of claim 1, wherein identifying a location of the mobile device includes identifying a location based on an IP address assigned to the mobile device.

7. The method of claim 1, wherein identifying a location of the mobile device includes identifying a country in which the mobile device is location.

8. The method of claim 1, wherein identifying a location of the mobile device includes identifying a location based on a calling number of the mobile device.

9. A computer storage device encoded with computer program instructions that when executed by one or more computers cause the one or more computers to perform operations comprising:
    identifying a content item to be provided to a mobile device;
    identifying a location of the mobile device;
    identifying at least one calling format based on the location;
    identify a calling number included in the content item based on the at least one calling format;
    generating an altered version of the content item to tag the calling number; and
    provide the altered version to the mobile device.

10. The device of claim 9, further encoded with computer program instructions that when executed by one or more computers cause the one or more computers to perform operations comprising determining to alter the content item based a comparison of a selection rate of previously provided altered versions of the content item to a selection rate of previously provided unaltered versions of the content item.

11. The device of claim 10, further encoded with computer program instructions that when executed by one or more computers cause the one or more computers to perform operations comprising altering the content item to report when the calling number is selected from the altered content item.

12. The device of claim 11, wherein the selection rate of previously provided altered versions is a ratio of the number of times the calling number is selected to the number of times the altered versions were provided.

13. The device of claim 9, wherein at the least one calling format is selected based on area codes located near the mobile device.

14. The device of claim 9, wherein identifying a location of the mobile device includes identifying a location based on an IP address assigned to the mobile device.

15. The device of claim 9, wherein identifying a location of the mobile device includes identifying a country in which the mobile device is location.

16. The device of claim 9, wherein identifying a location of the mobile device includes identifying a location based on a calling number of the mobile device.

17. A system comprising:
   one or more computers and one or more storage devices storing instructions that are operable, when executed by the one or more computers, to cause the one or more computers to perform operations comprising:
   identifying a content item to be provided to a mobile device;
   identifying a location of the mobile device;
   identifying at least one calling format based on the location;
   identify a calling number included in the content item based on the at least one calling format;
   generating an altered version of the content item to tag the calling number; and
   provide the altered version to the mobile device.

18. The system of claim 17, wherein the one or more storage devices further store instructions that are operable, when executed by the one or more computers, to cause the one or more computers to perform operations comprising determining to alter the content item based a comparison of a selection rate of previously provided altered versions of the content item to a selection rate of previously provided unaltered versions of the content item.

19. The system of claim 18, wherein the one or more storage devices further store instructions that are operable, when executed by the one or more computers, to cause the one or more computers to perform operations comprising altering the content item to report when the calling number is selected from the altered content item.

20. The system of claim 19, wherein the selection rate of previously provided altered versions is a ratio of the number of times the calling number is selected to the number of times the altered versions were provided.

21. The system of claim 17, wherein at the least one calling format is selected based on area codes located near the mobile device.

22. The system of claim 17, wherein identifying a location of the mobile device includes identifying a location based on an IP address assigned to the mobile device.

23. The system of claim 17, wherein identifying a location of the mobile device includes identifying a country in which the mobile device is location.

24. The system of claim 17, wherein identifying a location of the mobile device includes identifying a location based on a calling number of the mobile device.

* * * * *

UNITED STATES PATENT AND TRADEMARK OFFICE
CERTIFICATE OF CORRECTION

| | | |
|---|---|---|
| PATENT NO. | : 8,718,680 B2 | Page 1 of 1 |
| APPLICATION NO. | : 13/630102 | |
| DATED | : May 6, 2014 | |
| INVENTOR(S) | : Tao Huang and Deepak Chandra | |

It is certified that error appears in the above-identified patent and that said Letters Patent is hereby corrected as shown below:

In the Claims

Column 10, line 7, Claim 2, delete "based a" and insert -- based on a --.

Column 10, line 49, Claim 10, delete "based a" and insert -- based on a --.

Column 11, line 26, Claim 18, delete "based a" and insert -- based on a --.

Signed and Sealed this
Thirtieth Day of September, 2014

Michelle K. Lee
*Deputy Director of the United States Patent and Trademark Office*